US010232423B2

(12) United States Patent
Kishimoto et al.

(10) Patent No.: US 10,232,423 B2
(45) Date of Patent: Mar. 19, 2019

(54) MARKING METHOD, MARKING TOOL, AND PUNCH PRESS MACHINE

(75) Inventors: Hiroki Kishimoto, Kanagawa (JP); Shigeru Endo, Kanagawa (JP)

(73) Assignee: AMADA COMPANY, LIMITED, Kanagawa (JP)

( * ) Notice: Subject to any disclaimer, the term of this patent is extended or adjusted under 35 U.S.C. 154(b) by 1346 days.

(21) Appl. No.: 13/575,486

(22) PCT Filed: Jan. 28, 2011

(86) PCT No.: PCT/JP2011/051720
§ 371 (c)(1),
(2), (4) Date: Jul. 26, 2012

(87) PCT Pub. No.: WO2011/093435
PCT Pub. Date: Aug. 4, 2011

(65) Prior Publication Data
US 2012/0297848 A1 Nov. 29, 2012

(30) Foreign Application Priority Data

Jan. 29, 2010 (JP) ................................. 2010-018677

(51) Int. Cl.
*B21C 51/00* (2006.01)
(52) U.S. Cl.
CPC ........ *B21C 51/005* (2013.01); *B23C 2220/00* (2013.01)

(58) Field of Classification Search
CPC ............ B23C 2220/00; B23C 2220/48; B21C 51/005; B21D 28/12; B21D 28/246; B21D 22/18
See application file for complete search history.

(56) References Cited

U.S. PATENT DOCUMENTS 4,532,845 A * 8/1985 Jinnouchi .............. B21D 28/12
83/552
5,044,239 A * 9/1991 Endo .................... B21D 28/246
83/133

(Continued)

FOREIGN PATENT DOCUMENTS

JP 61-197174 9/1986
JP 03-090227 4/1991

(Continued)

OTHER PUBLICATIONS

Valenitesafety, V400 Single Insert Ball Nose End Mill, https://www.youtube.com/watch?v=vfDXZwSDSn4, Published Nov. 2, 2007.*

(Continued)

*Primary Examiner* — Pradeep C Battula
(74) *Attorney, Agent, or Firm* — Greenblum & Bernstein, P.L.C.

(57) ABSTRACT

In a method for marking on a surface of a work, kept is a state where an end of a rotating tool for marking is contacted with a surface of the work, and a rotation of the rotating tool is started at the same time when a relative movement of the work in an X-axis direction and/or in a Y-axis direction relative to the rotating tool is started. According to the above marking method, a width of a marked line can be made constant over its entire length.

3 Claims, 4 Drawing Sheets

(56) References Cited

U.S. PATENT DOCUMENTS

| | | | | |
|---|---|---|---|---|
| 5,259,100 | A * | 11/1993 | Takahashi | B21D 28/12 29/33 J |
| 5,394,335 | A * | 2/1995 | Rush | B21D 28/12 700/169 |
| 5,432,704 | A * | 7/1995 | Vouzelaud | B29C 67/0074 345/420 |
| 6,216,508 | B1 * | 4/2001 | Matsubara | B21D 22/00 72/125 |
| 6,597,968 | B2 * | 7/2003 | Matsumoto | G05B 19/4166 700/170 |
| 6,823,705 | B2 * | 11/2004 | Fukuda | B21D 22/185 72/214 |
| 7,168,364 | B2 * | 1/2007 | Schneider | B21O 51/005 101/26 |
| 7,559,727 | B2 * | 7/2009 | Kouno | B21D 28/12 408/124 |
| 7,721,578 | B2 * | 5/2010 | Enoki | B65D 7/04 413/4 |
| 8,463,421 | B2 * | 6/2013 | Brett | B23Q 15/013 408/1 R |
| 8,858,853 | B2 * | 10/2014 | Huskamp | B21D 22/18 264/219 |
| 2009/0099684 | A1 * | 4/2009 | Roders | B23Q 15/16 700/173 |

FOREIGN PATENT DOCUMENTS

| | | |
|---|---|---|
| JP | 2002-178044 | 6/2002 |
| JP | 2003-094197 | 4/2003 |
| JP | 2004-050346 | 2/2004 |
| JP | 2005-034950 | 2/2005 |
| JP | 2006-123063 | 5/2006 |
| JP | 2007-007776 | 1/2007 |
| JP | 2008-264931 | 11/2008 |
| KR | 20010084903 A * | 9/2001 |

OTHER PUBLICATIONS

ISR dated Mar. 8, 2011.
China Office action, dated Dec. 26, 2013.

* cited by examiner

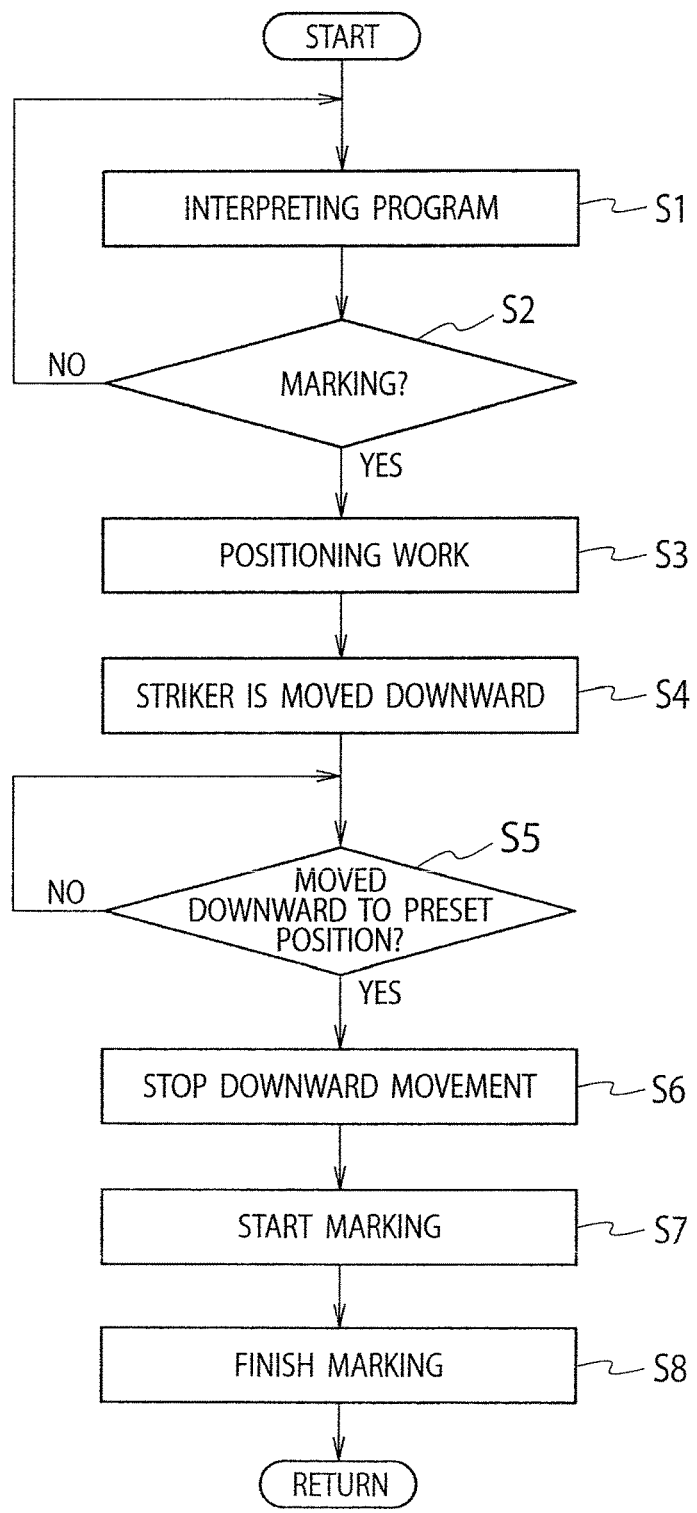

MARKING METHOD, MARKING TOOL, AND PUNCH PRESS MACHINE

TECHNICAL FIELD

The present invention relates to a method for marking on a surface of a plate-like work by a turret punch press machine and so on, a marking tool used for the method, and a punch press machine for conducting the method using the tool.

BACKGROUND ART

Conventionally, when punching a plate-like work in a punch press machine and so on, marking on a cutout piece (product) punched away from the work may be processed (see Patent Documents 1 and 2 listed below).

PRIOR ART DOCUMENT

Patent Document

Patent Document 1: Japanese Patent Application Laid-Open No. H3-90227
Patent Document 2: Japanese Patent Application Laid-Open No. 2005-34950

SUMMARY OF INVENTION

Problem to be Solved by the Invention

In the above Patent Document 1, disclosed is an apparatus that utilizes a die that includes a number of marking dies as marking tools. In this apparatus, since various markings on an upper surface of the work are to be made by the marking dies, various types of marking dies are needed. Therefore, configuration of the die becomes complicated.

In the above Patent Document 2, a pen is provided as a marking die, and disclosed is an apparatus in which markings on an upper surface of a work are made by the pen. Therefore, it is needed to control a remaining amount and drying of inks supplied to the pen.

In addition, laser marking is known as a conventional marking method. In this case, a laser oscillator and a laser working head must be needed additionally.

A plate-like work worked by a punch press machine may have a film made of resin such as vinyl on its surface as a protection film. With respect to such a work, it is generally done to peel the protection film from a product cut away from the work. Therefore, upon working the work by a punch press machine, if marking is made on a protection film, marking is done by using marking dies, or laser marking is done, marking residue may remain on a surface of a product.

If marking is done by a pen as disclosed in the above Patent Document 2, ink control may be needed as explained above, and also it is needed to select an ink suitable for a protection film on a work in some cases.

In addition, marking on a surface of a work also can be done by working such as cutting, grinding or the like by use of a rotating work took included in a punch press machine. However, in a case of working on a surface of a work by use of a rotational work tool, a marking amount (marking width) at a start position or an end position of marking becomes larger than a marking amount (marking width) while the rotating work took is being moved relatively to the work, so that its appearance may be inferior (their marking widths become different from each other). Further, in a case of working on a protection film by use of a rotational work tool, the protection film is torn, so that residue due to marking may remain on a surface of the work at a start position or an end position of marking.

Means for Solving the Problem

A first aspect of the present invention provides a method for marking on a surface of a plate-like work, the method including: keeping a state where an end of a rotating tool for marking is contacted with the surface of the work; and starting a relative movement of the work in an X-axis direction and/or in a Y-axis direction relative to the rotating tool, and concurrently starting a rotation of the rotating tool.

Here, it is preferable to stop the rotation of the rotating tool or to separate the marking tool from the surface of the work at the same time of stopping the relative movement of the work.

A second aspect of the present invention provides a method for marking on a surface of a plate-like work, the method including: keeping a rotational speed of a rotating tool for marking to a desired rotational speed; and starting a relative movement of the work in an X-axis direction and/or in a Y-axis direction relative to the rotating tool at a same time of contacting a spherical portion of the rotating tool with the surface of the work.

In the above first and second aspects, the work may have a protection film capable of being peeled away on its surface.

A third aspect of the present invention provides a marking tool used in the marking method of the above first or second aspect that includes a cylindrical tool body detachably and vertically movably attached to an upper die holder of a punch press machine; a rotational drive unit provided above the tool body; a hollow rotary shaft rotated by the rotational drive unit; a chuck vertically movably provided at a lower portion of the hollow rotary shaft and biased downward; and the rotating tool that includes a spherical portion for marking at a lower end thereof, wherein the rotating tool is detachably held by the chuck.

A fourth aspect of the present invention provides a punch press machine that conducts the marking method of the above first or second aspect by using the marking tool according to the third aspects, and includes an upper die holder to which the marking tool or a punch is replaceably installed; a work table for supporting the work worked by the marking tool or the punch; a moving and positioning unit for moving the work in an X-axis direction and/or a Y-axis direction relatively to the marking tool or the punch; a vertically movable striker that can press down a head member of the marking tool or the punch; a vertical position detector for detecting a vertical position of the striker; and a command output unit that outputs, under a condition where the marking tool is contacted with the surface of the work, an operational command concurrently to the moving and positioning unit and the marking tool.

Effects of the Invention

According to the above aspects, when marking on the surface of the work, a processing amount at a marking start position and a marking end position and a processing amount per a unit length of a marked line are made almost constant. Therefore, a width of the marked line is almost made constant over its entire length. In addition, in a case where a protection film is provided on a surface of a work and marking is processed on the protection film by a rotating tool, it can be prevented that the rotating tool tears the protection film and reaches to the surface of the work, so that no unfavorable marking is left on the work after peeling away the protection film.

BRIEF DESCRIPTION OF DRAWINGS

FIG. 4 It is a flowchart showing operations of the punch press machine.

DESCRIPTION OF EMBODIMENTS

Hereinafter, an embodiment will be explained with reference to the drawings. First, an overall configuration of a punch press machine will be explained.

Figure 1:
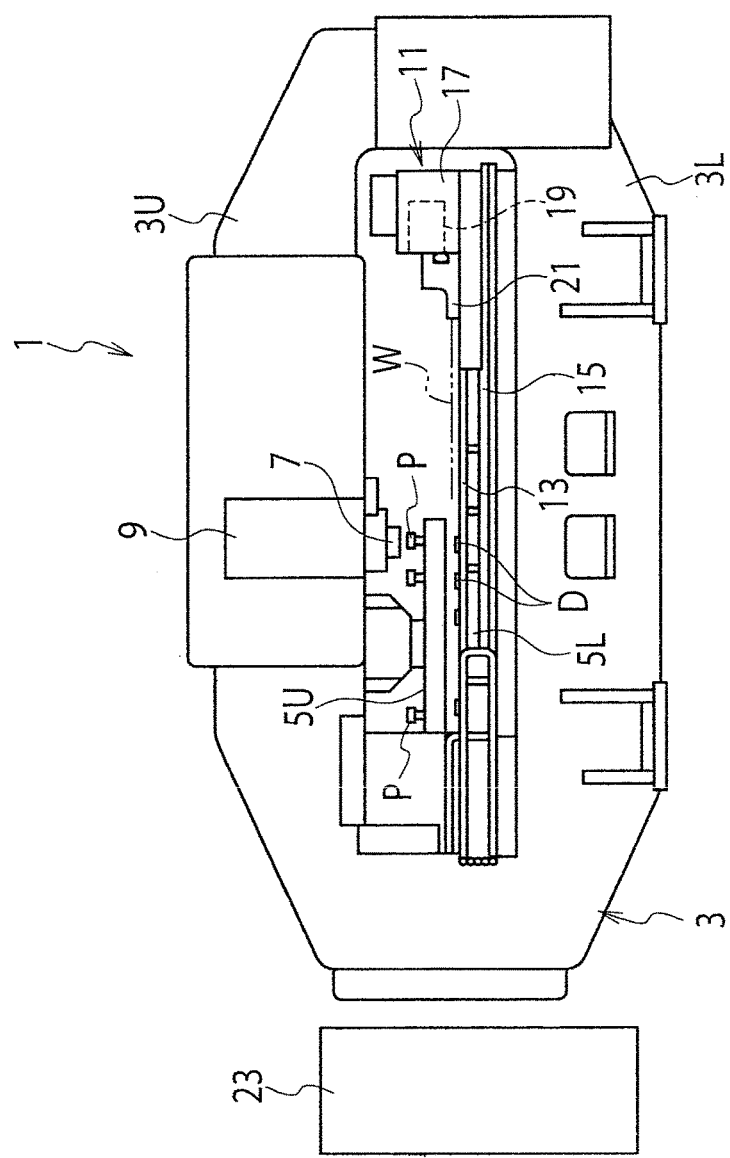
FIG. 1 It is a side view of a punch press machine according to an embodiment.

In FIG. 1, shown is the turret punch press machine 1 for working such as punching on a plate-like work W. The punch press machine 1 includes a frame 3 as generally known. The frame 3 is constructed integrally by an upper frame 3U and a lower frame 3L. On the upper frame 3U, an upper turret (upper die holder) 5U is provided horizontally-rotatably. On the lower frame 3L, a lower turret (lower die holder) 5L is provided horizontally-rotatably.

On the upper turret 5U, plural punch attachment holes 5H (see FIG. 2) are provided, and punches P are replaceably installed to the punch attachment holes 5H. On the lower turret 5L, plural die attachment holes (not shown) corresponding to the punch attachment holes 5H are provided, and replaceable dies D corresponding to the punches P are provided in the die attachment holes. In addition, on the upper turret 3U, a striker 7 is provided that strikes a punch head of a punch P set at a work position by rotations of the upper and lower turrets 5U and 5L.

The striker 7 is moved vertically by a ram driver 9. The ram driver 9 is, for example, a crank mechanism, a link mechanism or a ball screw mechanism that is rotated by a fluid pressure cylinder or a servomotor. A vertical position of the striker 7 to an original position (reference position: a top dead center, a bottom dead center or the like) is constantly detected by a vertical position detector 93 (see FIG. 3) such as a rotary encoder.

In addition, the punch press machine 1 includes a moving and positioning unit 11 that moves a work W in X- and Y-axis directions relatively to the punch P and the die D set at the work position (position below the striker 7) to set its position, and a work table 13 that movably supports the work W. The moving and positioning unit 11 includes a carriage base 17 that can move in the Y-axis direction (horizontal direction in FIG. 1) along guide rails 15 provided on the lower frame 5L.

The carriage base 17 is moved in the Y-axis direction by rotation of a Y-axis servomotor (not shown) and then its position is set, and extended in the X-axis direction (vertical direction in FIG. 1) perpendicularly intersecting with the Y-axis direction. The carriage base includes a carriage 19 that is moved in the X-axis direction by rotation of an X-axis servomotor (not shown) and then its position is set. The carriage 19 includes plural work clamps 21 for clamping the work W. Each position of the work clamps 21 can be adjusted in the X-axis direction.

Therefore, the carriage base 17 is moved in the Y-axis direction and then its position is set and the carriage 19 is moved in the X-axis direction and then its position is set, so that the work W clamped by the work clamps 21 is moved in the X- and Y-axis directions and then its position is set to set a to-be-worked portion on the work W at the work position (position of the punch P and the die D).

The punch press machine 1 includes a controller such as a CNC controller. The controller 23 mainly executes a rotation control of the upper and lower turrets 5U and 5L, a movement control of the moving and positioning unit 11, and a strike control of the striker 7.

Note that, since the punch press machine 1 with the above explained configuration is well known, its further detailed explanations are skipped.

Figure 2:
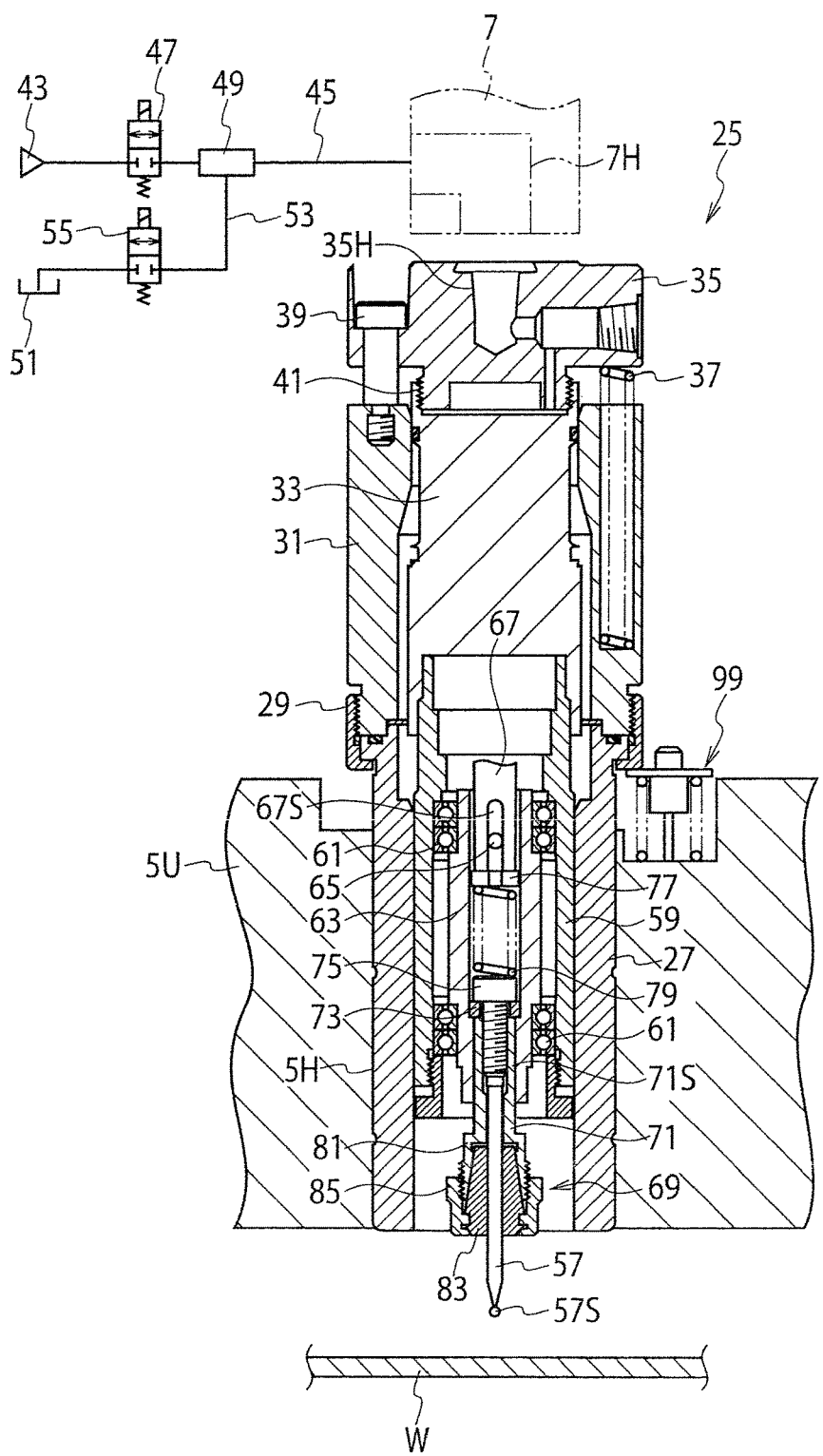
FIG. 2 It is a cross-sectional view of a marking tool.

A marking tool 25 in the present embodiment is used by being attached to the punch attachment hole 5H on the upper turret 5U as a substitute for one punch P attached on the upper turret (upper holder) 5U, as shown in FIG. 2. The marking tool 25 includes a cylindrical tool body 27 similarly to a conventional punch P. The tool body 27 is detachable to the punch attachment hole 5H, and supported in a state where it is plunged into the punch attachment hole 5H. A cylindrical upper body 31 is coupled with an upper portion of the tool body 27 by a fastener 29 such as a cap nut. A fluid pressure motor (rotary drive unit) 33 such as an air motor is vertically movably housed in the upper body 31.

A head member 35 is vertically movably supported at an upper portion of the upper body 31 in order to support the fluid pressure motor 33 vertically movably in the upper body 31. Namely, the head member 35 is supported while being biased upward by a coil spring (elastic member) 37 attached between the upper body 31 and the head member 35. An upward movement of the head body 35 is restricted by plural stopper bolts 39 whose lower ends are screw-mounted into the upper body 31. The fluid pressure motor 33 and the head member 35 are jointed to each other at a screw-joint portion 41.

In order to supply working fluid, the head member 35 is provided with a connection hole 35H connected to a supply hole 7H formed on the striker 7. The connection hole 35H is connected to the fluid pressure motor 33. The supply hole 7H supplies oil mists to the punch P. On a connection path 45 that connects the supply hole 7H to an air source 43, an open-close valve 47 such as a solenoid valve and an ejector 49 are provided sequentially from the air source 43. A connection path 53 connected to an oil tank 51 is connected to the ejector 49. An open-close valve 55 is provided on the connection path 53.

When the open-close valve 47 is opened in a state where the striker 7 is being contacted with the head member 35, air of the air source 43 is supplied to the fluid pressure motor 33 to drive the fluid pressure motor 33. In addition, when the open-close valve 47 and the open-close valve 55 are opened, oil in the oil tank 51 is suctioned by the ejector 49 and then supplied to the connection path 45 as oil mists. Therefore, air or oil mists can be selectively supplied from the supply hole 7H, so that unnecessary oil consumption can be restricted.

In a cylindrical bearing holder 59 within the tool body 27, a hollow rotary shaft 63 is provided rotatably via plural bearings 61. Rotation of the fluid pressure motor 33 is transmitted to a marking pin (rotating tool) 57 of the marking tool 25 via the hollow rotary shaft 63. An upper portion of the hollow rotary shaft 63 is coupled with a rotary shaft 67 of the fluid pressure motor 33 by a coupling pin 65, so that the hollow rotary shaft 63 rotates integrally with the rotary shaft 67. The coupling pin 65 perpendicularly intersects with a shaft center of the hollow rotary shaft 63, and its both ends are fixed to the hollow rotary shaft 63. A middle of the coupling pin 65 is coupled with a slit 67S axially formed at an end of the rotary shaft 67.

A vertically movable chuck 69 is provided at a lower portion of the hollow rotary shaft 63 while being biased downward. The marking pin 57 is detachably attached to the chuck 69. The chuck 69 in the present embodiment is a collet chuck. A shank 71S that is an upper portion of a chuck main body 71 of the chuck 69 is plunged into the hollow rotary shaft 63 vertically movably but unrotatably. A ring spacer 73 that has a slightly larger diameter than a diameter of the shank 71S is attached onto an upper surface of the shank 71S by a bolt 75.

A coil spring (elastic member) 79 is provided, while being compressed, between a spring seat 77 contacted with a lower end surface of the rotary shaft 67 and a head of the bolt 75. The shank 71S is meshed with the hollow rotary shaft 63 by splines or keys, and continuously biased downward by the coil spring 79. Note that, since the spacer 73 is contacted with a stepped portion of the hollow rotary shaft 63, the chuck main body 71 is prevented from dropping off.

A large diameter portion 81 in which a tapered hole is formed is provided at a lower portion of the chuck main body 71. A collet 83 for holding the marking pin 57 is housed in the tapered hole. A nut 85 is screwed with an outer circumferential surface of the large diameter portion 81, and, when the nut 85 is fastened, the collet 83 fixes the marking pin 57.

According to the above-explained configuration, rotation of the rotary shaft 67 of the fluid pressure motor is transmitted to the marking pin 57. A spherical portion 57S is formed at a distal end (lower end) of the marking pin 57, and the spherical portion 57S engraves markings on a surface of the work W. Hard fine particles such as diamonds are provided on the spherical portion 57S.

A marking is engraved by spinning the marking pin 57 while contacting the spherical portion 57S with the surface of the work W and moving the spherical portion 57S relatively to the work W to draw a line on the surface of the work W. In a case where the marking is processed while the spherical portion 57S is contacted with the surface of the work W, an unfavorable circular marking having a diameter larger than a width of the line may be left at a start position (marking start position) and an end position (marking end position) of the marking.

In addition, in a case where a marking is processed only to a protection film on a surface of a work W, an unfavorable marking may be left on the surface of the work W after peeling away the protection film. Improvement of marking quality that can prevent these unfavorable markings is desired.

Figure 3:
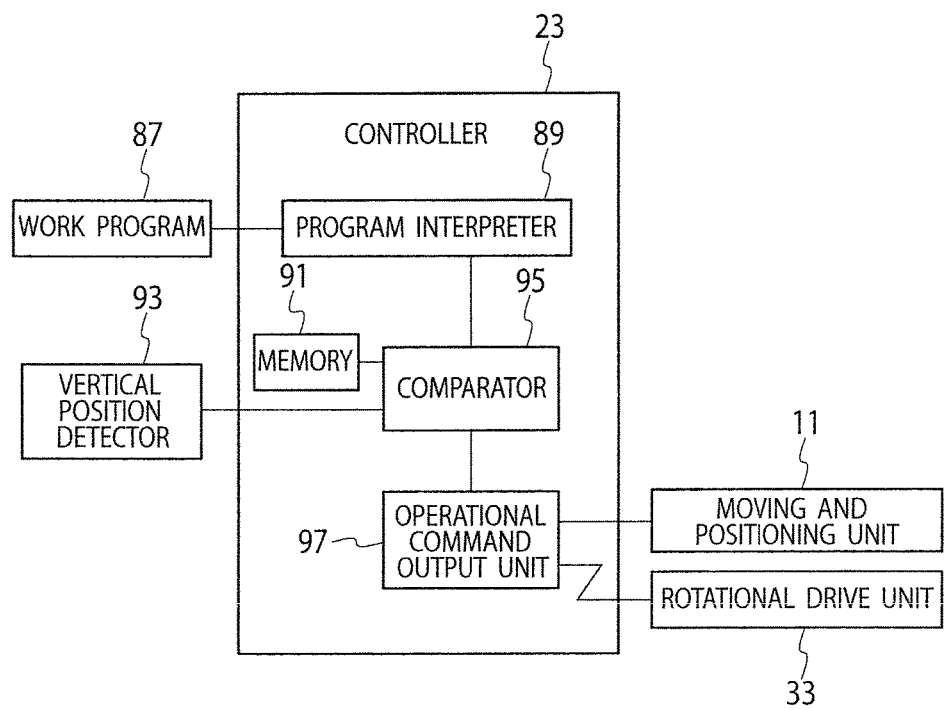
FIG. 3 It is a functional block diagram showing main components of the punch press machine.

Therefore, in the present embodiment, improvement of marking quality is adopted. Namely, the controller 23 includes a program interpreter 89 and a comparator 95, as shown in FIG. 3. The program interpreter interprets a work program 87 input thereto. The comparator 95 compares, in a case where a marking process is found in the work program interpreted by the program interpreter 89, a preset value preset in a memory 91 with a detected value of the vertical position detector 93 that detects the vertical position of the striker 7. In addition, the controller 23 includes an operational command output unit 97 that outputs an operational command concurrently to the moving and positioning unit 11 and the rotational drive unit 33 when the preset value is equal to the detected value mentioned above.

The preset value preset in the memory 91 is a value corresponding to a stroke amount from a position at which the striker 7 starts moving downward from its top dead center (or its reference position when lifted up) to become contacted with the head member 35 to a position at which the spherical portion 57S of the marking pin 57 becomes contacted with the upper surface (the surface) of the work W while the marking tool is moved downward against a lifter spring 99 (see FIG. 2).

Note that known is a distance S1 between a bottom surface of the striker 7 and an upper surface of the head member 35 at a time when the striker positions at its reference position. In addition, also known is a distance S2 between the spherical portion 57 and the upper surface of the work W in a state where the marking tool 25 is lifted up by the lifter spring 99. Therefore, the preset value preset in the memory 91 is (S1+S2+$\alpha$). Here, $\alpha$ is a correction value corresponding to thickness tolerance when the work W is made, and can take zero. The value $\alpha$ is determined by previously measuring a thickness of the work W.

Processes of marking will be explained with reference to FIG. 4. First, the work program is interpreted by the program interpreter 89 (step S1). Then, if a marking process is found in the work program (YES in step S2), a to-be-worked portion of the work W is positioned in association with the marking tool 25 previously positioned at the work position (step S3) and the striker 7 is moved downward by the ram driver 9 (step S4).

The position of the striker 7 moved downward from its reference position is detected by the vertical position detector 93, and the comparator 95 compares the detected value by the vertical position detector 93 with the preset value stored in the memory 91. If the detected value is equal to the preset value (YES in step S5), it is judged that the spherical portion 57S of the marking pin 57 is contacted with the upper surface of the work W and a downward motion of the striker 7 is stopped (step S6).

Note that, when the spherical portion 57S is contacted with the upper surface of the work W, the coil spring 79 is slightly compressed so as to absorb an error, a minor error in the preset value can be compensated. Namely, is can be done to preset the preset value slightly large, so that the spherical portion 57S can be contacted with the upper surface of the work W unfailingly.

When the striker 7 and the marking tool 25 are moved downward to the preset position previously set, the operational command is output from the operational command output unit 97 to the moving and positioning unit 11 and the rotational drive unit 33. As a result, spinning of the marking pin 57 is started and traveling thereof for marking on the work W is concurrently started, so that marking is processed (step S7).

Namely, under a condition where the spherical portion 57S of the marking pin 57 is contacted with the upper surface of the work and the marking pin 57 is kept to be slightly biased downward by the coil spring 79, relative movement of the work W in the X-axis and/or Y-axis direction and spinning of the marking pin 57 are concurrently started. Therefore, the marking start position (start position) is not processed more than a portion of drawing a line, so that no unfavorable circular marking having a diameter larger than a width of the line is left at the marking start position.

Note that a time needed for the marking pin 57 to reach a desired rotational speed is almost equal to a time needed for the work W to reach a desired moving speed. Therefore, a moving speed of the work W accelerates to the desired moving speed while a rotational speed of the marking pin 57 accelerates to the desired rotational speed. A processing amount per a unit length of a marked line by the marking pin 57 during these accelerations is almost equal to a processing amount per a unit length of a marked line while a moving speed of the work W is the desired moving speed and the a rotational speed of the marking pin 57 is the desired rotational speed. Therefore, a width of the marked line during the accelerations is almost equal to a line width while a moving speed of the work W is the desired moving speed and the rotational speed of the marking pin 57 is the desired rotational speed.

Here, if a contact time of the marking pin 57 with the work W in one segment on the marked line becomes longer than that in other segments, the processing amount in the one segment becomes larger than that in the other segments and thereby its line width becomes bold, because the marking pin 57 is biased downward by the coil spring 79. Therefore, in a case where the moving speed of the work W relative to the marking pin 57 is constant, it is preferable that the contact time of the work W with the marking pin 57 per a unit length of a marked line is constant. Namely, it is preferable that a processing amount per a unit length of a marked line is kept constant over an entire length of the marked line.

As explained above, since moving of the work W and spinning of the marking pin 57 are started concurrently, the processing amount by the marking pin 57 at the marking start position is almost equal to a processing amount at a given position on the marked line, and the processing amount per a unit length of the marked line is also constant, so that a width of the marked line becomes constant over its entire length.

After step S7, the marking process is finished (step S8). If the marking end position is positioned outside the work W or outside a product, it doesn't become a problem to continue spinning of the marking pin 57 at the marking end position in step S8. However, if the marking end position is positioned upon a product, the relative movement of the work W and the spinning of the marking pin 57 are stopped concurrently. Alternatively, in step S8, the marking pin 57 is separated from the work W at the same time when the relative movement of the work W is stopped. According to these, no unfavorable circular marking having a diameter larger than a width of the line is left at the marking end position.

As explained above, under a condition where the marking pin 57 is contacted with the work W, the movement of the work W and the spinning of the marking pin 57 is concurrently started, and the movement of the work W and the spinning of the marking pin 57 is concurrently ended (alternatively, the marking pin 57 is separated from the work W), so that no unfavorable circular marking is left at the marking start position and the marking end position on the work W having a thin protection film on its surface. Namely, even if the protection film is extremely thin, marking can be processed without tearing the protection film (without penetrating the protection film). Therefore, no unfavorable circular marking is left on a surface of a product.

As explained above, since the contact time of the work W with the marking pin 57 per a unit length of a marked line is constant, uniform workings can be done over the entire length of the marking line. Namely, no fluctuation of the processing amount on the marked line is made, so that the line width becomes constant over the entire length and thereby its appearance improved.

Note that, although the rotary drive unit 33 in the present embodiment is a fluid pressure motor, it may be a servomotor. In addition, it may be done that the relative movement of the work W in the X-axis and/or Y-axis direction is started at the same time when the marking tool 25 being spun at a desired rotational speed is contacted with the work W.

The invention claimed is:

1. A method for marking on a surface of a plate-shaped work by a rotating tool rotated by a rotary drive unit, the method comprising:
   keeping a state where an end of a shaft of the rotating tool for marking contacts the surface of the work, where a relative movement of the work is stopped in an X-axis direction and/or in a Y-axis direction relative to the shaft of the rotating tool, and where a rotation of the rotating tool is stopped; and
   starting a relative movement of the work in an X-axis direction and/or in a Y-axis direction relative to the shaft of the rotating tool, and concurrently starting a rotation of the shaft of the rotating tool by the rotary drive unit, so that a moving speed of the work accelerates to a desired moving speed while a rotational speed of the rotating tool accelerates to a desired rotational speed, thereby a processing amount per unit length of a marked line by the rotating tool during the accelerations is almost equal to a processing amount per unit length of a marked line while the moving speed of the work is the desired moving speed and the rotational speed of the rotating tool is the desired rotational speed.

2. The method for marking according to claim 1, further comprising:
   stopping the rotation of the shaft of the rotating tool or rotating the marking tool from the surface of the work at a same time of stopping the relative movement of the work.

3. The method for marking according to claim 1, wherein the work has a protection film capable of being peeled away on the surface thereof.

\* \* \* \* \*

UNITED STATES PATENT AND TRADEMARK OFFICE
CERTIFICATE OF CORRECTION

PATENT NO. : 10,232,423 B2
APPLICATION NO. : 13/575486
DATED : March 19, 2019
INVENTOR(S) : H. Kishimoto et al.

Page 1 of 1

It is certified that error appears in the above-identified patent and that said Letters Patent is hereby corrected as shown below:

In the Claims

Column 8, Line 48 (Claim 2) please change "rotating the marking tool" to -- separating the rotating tool --

Signed and Sealed this
Fifteenth Day of October, 2019

Andrei Iancu
*Director of the United States Patent and Trademark Office*